United States Patent [19]
West

[11] 4,046,038
[45] Sept. 6, 1977

[54] METHOD AND APPARATUS FOR CUTTING OPEN HOLLOW ARTICLES

[75] Inventor: Theodore V. West, Michigan City, Ind.

[73] Assignee: United States Steel Corporation, Pittsburgh, Pa.

[21] Appl. No.: 737,470

[22] Filed: Nov. 1, 1976

[51] Int. Cl.² .................... B23B 1/00; B23B 3/06; B23B 3/04
[52] U.S. Cl. .................................. 82/47; 82/55; 82/101; 82/60
[58] Field of Search ............... 82/46, 55, 59, 60, 71, 82/81, 89, 101, 47, 86

[56] References Cited
U.S. PATENT DOCUMENTS

| 397,888 | 2/1889 | Barras | 82/55 |
| 535,121 | 3/1895 | Sanford | 82/101 |
| 954,955 | 4/1910 | Grossman | 82/55 |
| 1,332,912 | 3/1920 | Mitchell et al. | 82/59 |
| 3,157,080 | 11/1964 | Hanni | 82/55 |
| 3,218,894 | 11/1965 | Ho Chow | 82/101 |
| 3,621,741 | 11/1971 | Bourgeois | 82/101 |
| 3,898,898 | 8/1975 | Peres | 82/47 |

*Primary Examiner*—Harrison L. Hinson
*Attorney, Agent, or Firm*—Frank Madonia

[57] ABSTRACT

Apparatus is disclosed for cutting open a blow-molded container such as a refuse can. A pair of knife blades are pivotally mounted to a knife which is pivotal about an axis orthogonal to the axis of pivot of the blades. The knife has a pair of cam followers for guiding it around the container by following a cam track conforming to the shape of the article.

8 Claims, 9 Drawing Figures

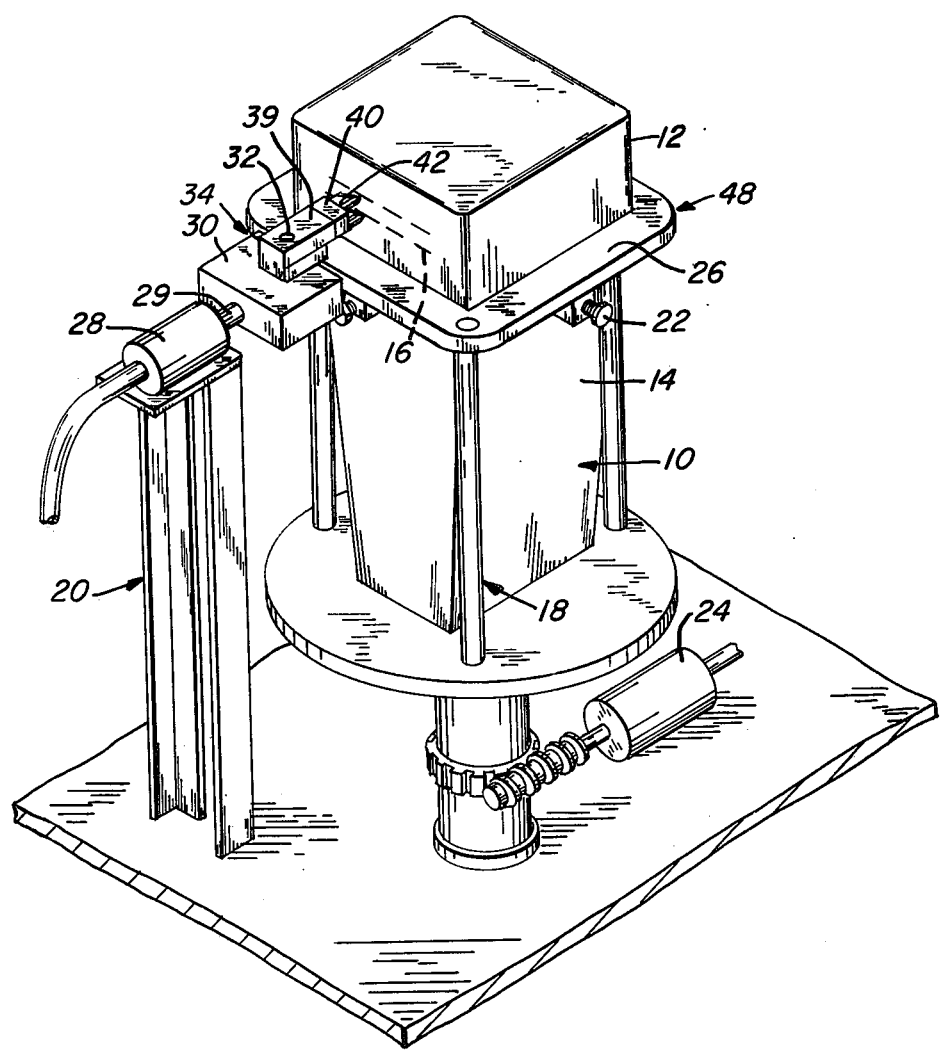

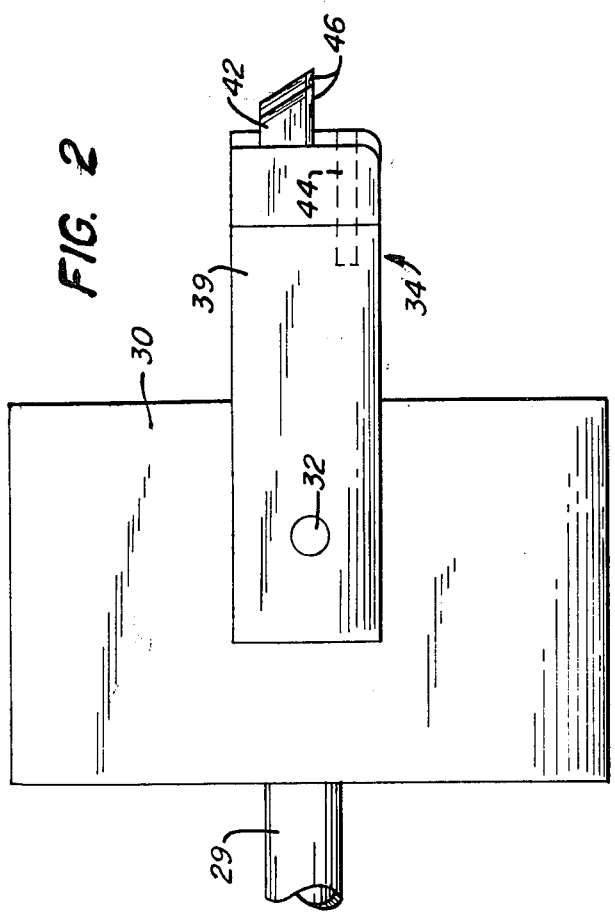
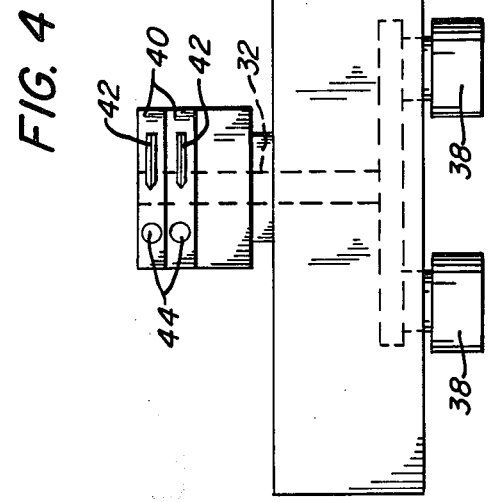
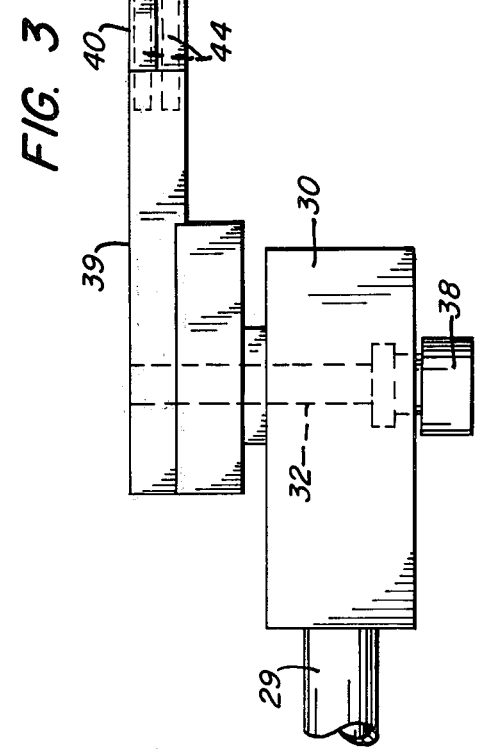

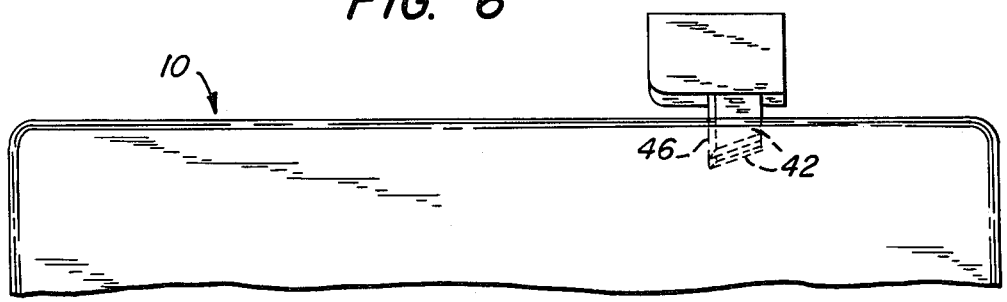
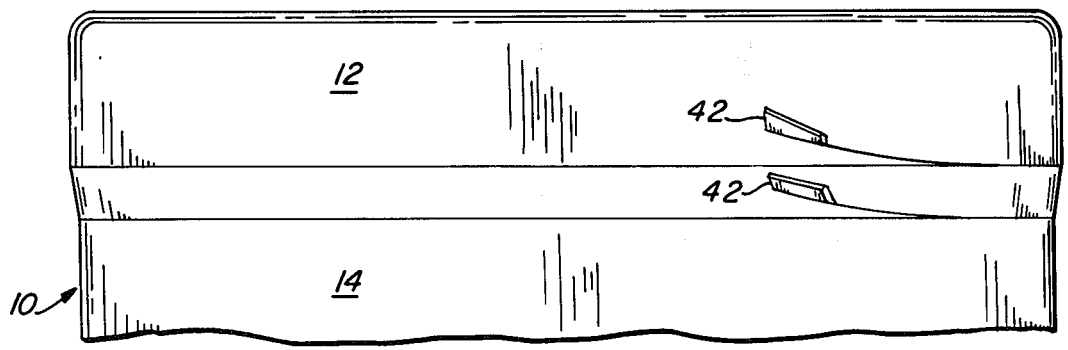
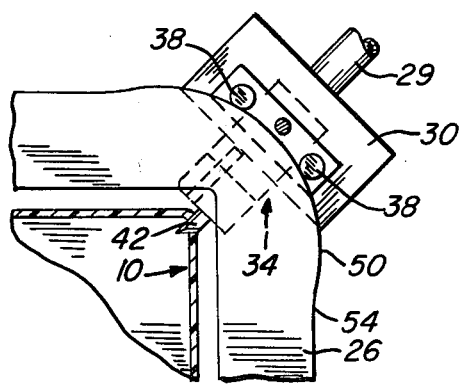
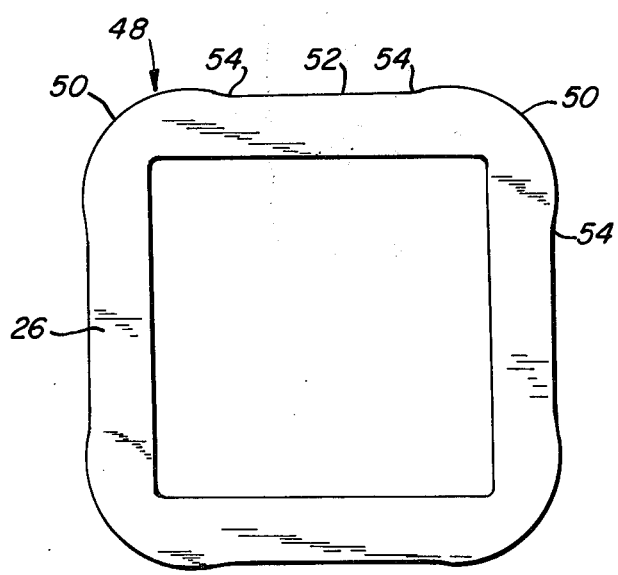

METHOD AND APPARATUS FOR CUTTING OPEN HOLLOW ARTICLES

FIELD OF THE INVENTION

This invention relates to apparatus for cutting hollow articles, especially blow-molded plastic articles. More particularly, this invention relates to cutting away the waste material between a blow-molded container and its top.

In the manufacture of blow-containers, it is possible, even desirable, to mold the top of the container integrally with the container itself. The top is joined to the container by a narrow strip of waste material. To make the article into a usable container, the waste material must be cut away, leaving a container portion and a top portion. This invention is useful in severing the waste material from the two portions of the container.

BACKGROUND OF THE INVENTION

Until this invention, the top was severed from the container portion by routing the joining or waste material between the top and the container. This practice left a rough and uneven edge on both parts. It also caused the entire joining strip to be ground up into non-recyclable material. The parts when cut with the router or other similar rotating tools required further trimming by hand. Furthermore, because the rotating tool is prone to producing an uneven cut, scrap articles were frequently produced.

Cutting open blow-molded containers using a knife blade rather than a rotating tool is shown in U.S. Pat. No. 3,662,633. The closed container is rotated under a knife blade to remove the expansion head. However, there are drawbacks to the use of this apparatus: square or other non-circular objects would be difficult if not impossible to cut; the knife blade is inherently under stress when cutting and therefore plows and gouges the plastic or is likely to be broken; the workpiece must have an integral groove and head for guiding and controlling the knife; and many revolutions of the article are necessary for severing.

SUMMARY OF THE INVENTION

This invention provides for severing of the top from the container portion by cutting away the joining strip with knife blades. Thus, the joining strip is salvaged and can be recycled; the edges of the article produced are even and smooth and require no further trimming; and scrap articles are virtually elminiated.

OBJECTS OF THE INVENTION

The primary object of this invention is to utilize knife blades for severing the parts of a blow-molded container and thereby avoid the concomitant problems in the use of a rotating tool such as a router.

Another object of this invention is to salvage the joining strip between the top and the container portions of a blow-molded container.

A further object of this invention is to provide a clean, smooth cut which does not require further trimming when severing the parts of blow-molded articles.

Still another object of this invention is to provide a pivotal mounting for the kife blades used in severing the workpiece.

A still further object of this invention is to provide a guide for the knife blades to keep them in cutting relation with the article being cut so that square or irregularly-shaped articles may be severed.

A further object still is to remove the scrap portion of a blow-molded article with a single pass of a knife.

BRIEF DESCRIPTION OF THE DRAWINGS

FIG. 1 is a partial isometric view of the general arrangement of the preferred embodiment of the invention.

FIGS. 2, 3 and 4 are the plan, elevation and side views, respectively, of the knife arrangement made in accordance with the preferred embodiment of the invention.

FIGS. 6 and 7 are diagrammatic views of knife blades binding in a workpiece.

FIG. 8 is a plan view of a cam track made in accordance with this invention.

FIG. 9 is a diagrammatic bottom view of a portion of the invention illustrating the relationship of the article, the blade, the cam and the cam followers.

DESCRIPTION OF THE PREFERRED EMBODIMENT

Figure 5:
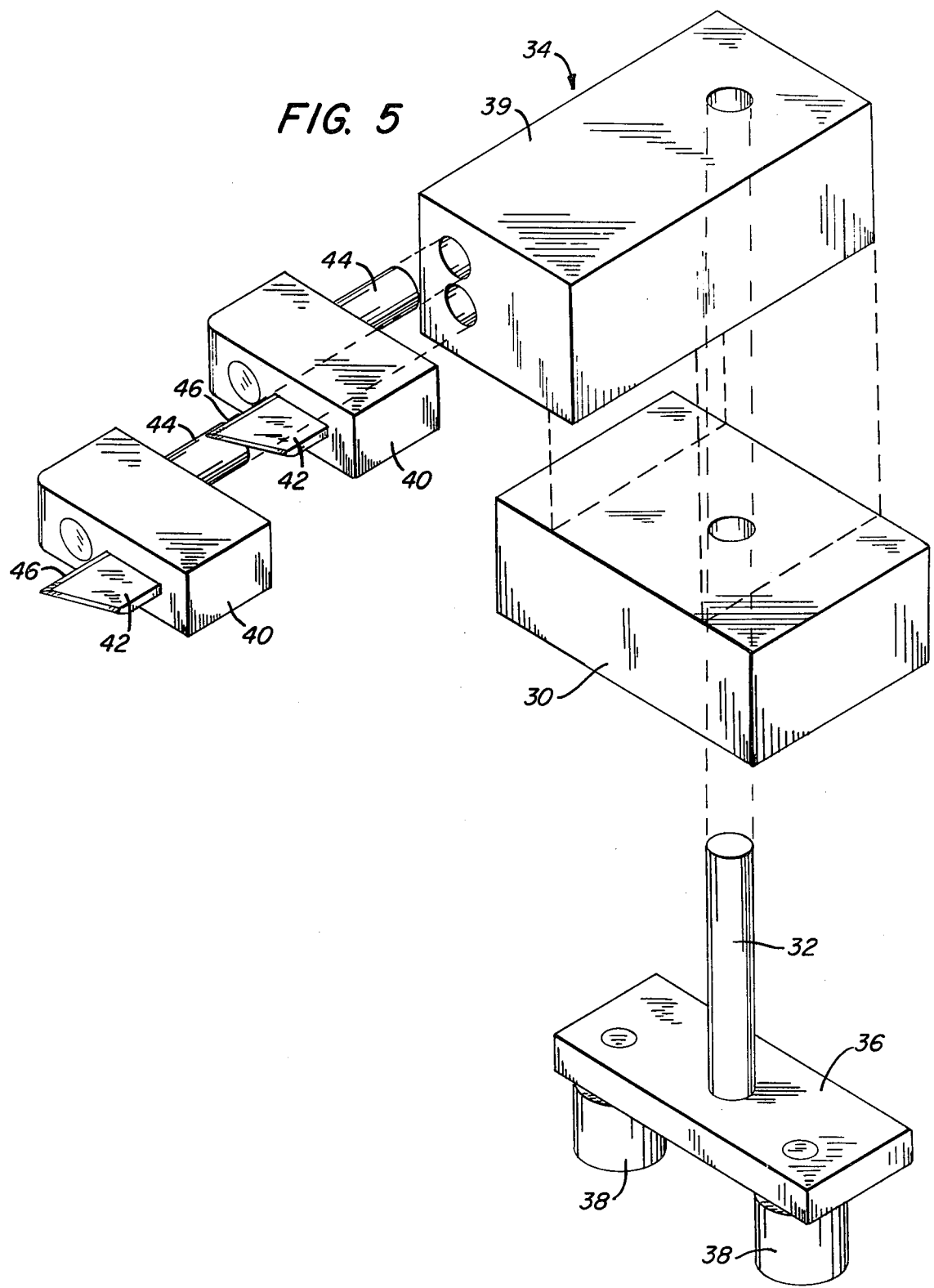
FIG. 5 is an exploded isometric view of the blades, blade clampls, arm, and the knife support.

The blow-molded plastic article shown in the drawings is a refuse can 10 having a generally square cross-section. It comprises a top portion 12, a container portion 14, and a joining or scrap portion 16. The scrap portion is the portion to be cut away thus separating the container portion and the top portion. Refuse can 10 is in a cage 18. Cage 18 is rotatably mounted to support 20 for rotation about a longitudinal axis. Can 10 is held in place in cage 18 by clamps 22 so that it, too, will rotate about a vertical longitudinal axis as cage 18 is rotated. Drive motor 24 is for rotating cage 18 and can 10. Attached to cage 18 is cam track 26 which conforms to the shape of the outer periphery of can 10. The use of the cam track will be more fully described hereinafter. Hydraulic cylinder 28 is also mounted on support 20. The centerline of the cylinder is perpendicular to the longitudinal axis of cage 18. The rod 29 of the cylinder carries knife support 30.

Knife support 30 is drilled to receive shaft 32 on an axis parallel to the longitudinal axis of cage 18. Shaft 32 is also perpendicular to the centerline of cylinder 28. To one end of shaft 32 is attached knife 34. To the other end is attached cam follower support 36. A cam follower 38 is attached at each end of support 36. With the knife 34 and cam follower support 36 so arranged, knife 34 will pivot or oscillate about shaft 32 in response to movement of cam follower support 36 for guiding knife 34 around can 10. Knife 34 comprises an arm 39 that is drilled to receive a pair of pivoting knife blade clamps 40 in which are mounted knife blades 42. The number of knife blade carriers needed, of course, would depend upon the number of cuts desired in the article. In this embodiment two cuts are to be made. Each knife blade clamp 40 is slotted on one end to received the knife blade 42. The other end is drilled to receive a pivot shaft 44 with the centerline of the pivot shaft lying approximately in the plane of the knife blade 42. When the knife blades 42 are mounted in the clamps 40 and the clamps pivotally mounted to the arm 39, the knife blade 42 is able to pivot in response to a force against its side. This pivoting of the knife is similar to the movement of a windvane and is a key to maintaining a smooth cutting plane.

When cutting plastic, it is important to properly guide the cutter so that a smooth, even cut is achieved. The width of the knife blade moving in the cut will guide the blade as it cuts the article. However, experience has shown that this same guiding effect can operate detrimentally. If the knife blade should begin to travel away from the desired path, it will tend to continue in the wrong direction until it finally binds in the plastic. Binding occurs as a result of the moment generated by the guiding force of the knife blade opposing the force tending to push the knife along the desired path through the plastic. If this binding pressure is not relieved, the knife blade will be broken off in the plastic as depicted in FIGS. 6 and 7. The windvane effect is the vehicle for relieving the binding pressure. Just as a windvane moves to the path of least wind resistance, the pivotally mounted knife blade moves to compensate for irregular movement between the knife support and the can. The knife blade follows the pivot shaft. Binding is thus eliminated and, therefore, knife blades are no longer broken. It is apparent in the drawings that knife blade clamps 40 are not able to rotate 360° about shafts 44 as each clamp interferes with the other. However, the slight amount of pivoting available for each carrier as illustrated in FIG. 4 is sufficient to accomplish the desired result. The amount of pivoting may be increased or decreased by changing the spacing between the carriers. It is important to note that proper pivoting can only be accomplished when the knife blade 42 and the pivot shaft 44 lie in approximately the same plane. Without this feature the blade will be under a severe stress as it severs the article and the likelihood of plowing and gouging the article and, worse, breaking the blade is great. The variance between the plane of the knife blade and the centerline of the shaft should be no more than the radius of the shaft. In the preferred embodiment, the thickness of the blade is approximately 0.025 inches and the diameter of the shaft is approximately 0.375 inches. When cutting an article having a wall thickness of 0.25 inches, the blade may be off-center no more than 0.100 inches but preferably no more than .003 inches.

In the operation of this apparatus, drive motor 24 begins to rotate cage 18 holding refuse can 10. Hydraulic cylinder 28 is energized and moves knife support 30 toward refuse can 10. Knife support 30 continues to move until cam followers 38 are urged into engagement with cam track 26. Just prior to the engagement of the cam followers with the cam track, blades 42 pierce refuse can 10 at the top and bottom of joining portion 16 and begin to sever the article into its component parts. Because the knife blade is long enough to pierce through the wall of the hollow article, the joining strip portion is removed with one revolution of the article. While the preferred operation utilizes a stationary knife and a rotating article, it is envisoned that severing could be accomplished by revolving the knife around a stationary article or by moving each in opposite directions.

Cam track 26 is designed to maintain knife blades 42 in cutting relation to refuse can 10. Cutting relation means that knife blade 42 has its leading edge 46 substantially perpendicular to the tangent line at the point of separation of the article. The cam track must be shaped to approximately conform with the perimetrical shape of the article at the plane of the desired cut. To insure that cutting relation is maintained between the knife blades and the can around the corners of the can, the corners 48 around the outer periphery of the cam track are bulbous-shaped (FIG. 8). The bulbous shape refers to a curve 50 that is concave with respect to the point of intersection of an extension of the sides 52 on either side of the corner. For a substantially square article, as is the refuse can, the cam track is substantially square. The shape of the cam track would, of course, vary according to the shape of the article sought to be cut. For example, an article having a pentagonal cross-section would require a pentagonal cam track having a bulbous portion at each corner similar to corners 48. When installed in the apparatus, the cam track should be in radial alignment with the article. The radius of curvature of the bulbous corner lies on a radial line drawn through the longitudinal article axis and the corner of the article. Cam followers 38 move in relation to the shape of cam track 26 and correspondingly knife 34 moves in response to movement of the cam followers 38. The bulbous corners 48 of cam track 26 are designed to provide, in addition to proper cutting relation for the knife blades and the article, a transition in a generally continuous manner for cam followers 38. Convex curves 54 provide a curvilinear joining of concave curve 48 to sides 52. An attempt to cut the corner of hollow can 10 using a cam without bulbous corners results in tearing the entire corner from the can. Because of the bulbous corners, the knife is pulled slightly away from the can momentarily as the first cam follower begins to move around the corner. When both cam followers are on the corner, the knife blade is cutting the corner of the can as cutting relation is maintained between the blade and the article (FIG. 9).

While the description of the preferred embodiment of this invention related hereinbefore is illustrative of the invention, it is not intended that this description limit the scope of the invention as defined in the following claims.

I claim:

1. Apparatus for cutting a hollow article along a severing plane substantially perpendicular to the longitudinal axis of said article, said apparatus comprising:
   A. a knife support;
   B. a knife comprising
      i. an arm, said arm being pivotally mounted to said knife support about an axis substantially parallel to said longitudinal article axis,
      ii. at least one blade clamp pivotally mounted to said arm about an axis lying approximately in said severing plane, and
      iii. a blade mounted in said blade clamp, said blade having a cutting edge extending in a direction away from said arm toward said article and terminating in a point for piercing said article;
   C. means for providing relative movement between said knife said and article around the periphery thereof;
   D. means for directing said knife support toward said longitudinal article axis whereby said article may be cut; and
   E. means for controlling the pivoting of said knife arm relative to the shape of said article to maintain said blade in cutting relation to said article.

2. Apparatus as defined in claim 1 wherein said pivoting controlling means comprises a cam track having an outer perimeter conforming to the perimetrical shape of said article at the severing plane and cam followers attached to said knife for engagement with said cam track when said knife support is directed toward said article axis, said cam track in a fixed position with respect to said article.

3. Apparatus as defined in claim 1 wherein said directing means is a hydraulic cylinder.

4. Apparatus as defined in claim 1 wherein said means for providing relative movement comprises means for rotating said article about said longitudinal axis.

5. A method of cutting a hollow article along a severing plane substantially perpendicular to the longitudinal axis of said article utilizing apparatus comprising:
   A. a knife support;
   B. a knife comprising
      i. an arm, said arm being pivotally mounted to said knife support about an axis substantially parallel to said longitudinal article axis,
      ii. at least one blade clamp pivotally mounted to said arm about an axis lying approximately in said severing plane, and
      iii. a blade mounted in said blade clamp, said blade having a cutting edge extending in a direction away from said arm toward said article and terminating in a point for piercing said article;
   C. means for providing relatie movement between said knife and said article around the periphery thereof;
   D. means for directing said knife support toward said longitudinal article axis whereby said article may be cut;
   E. a cam track in a fixed position with respect to said article, said cam track having an outer perimeter approximately conforming to the perimetrical shape of said article at the severing plane, and cam followers attached to said knife for engagement with said cam track when said knife support is directed toward said article axis; said method consisting of
      1. providing relative movement between said knife and the periphery of said article around the periphery thereof and
      e. directing said knife support toward said longitudinal article axis whereby article may be cut while freely maintaining said blade in said severing plane.

6. A method according to claim 5 wherein step 1 comprises rotating said article about said longitudinal axis.

7. A method according to claim 5 wherein said article has a severing plane cross-sectional configuration which includes at least three outside corners.

8. A method according to claim 7 wherein said outer perimeter has sides and bulbous-shaped corners curvilinearly joining said sides, so that said cam followers are able to make a smooth transition from the sides and around said bulbous corners, said bulbous corners being in radial alignment with the outside corners of the article.

* * * * *

UNITED STATES PATENT OFFICE
CERTIFICATE OF CORRECTION

Patent No. 4,046,038            Dated September 6, 1977

Inventor(s) Theodore V. West

It is certified that error appears in the above-identified patent and that said Letters Patent are hereby corrected as shown below:

Column 3, line 55, change "envisoned" to -- envisioned --.

Column 5, line 21, change "relatie" to -- relative --.

Column 6, line 10, change "e." to -- 2. --;

line 11, after "whereby" insert -- said --.

*Signed and Sealed this*

*Twentieth* Day of *December 1977*

[SEAL]

*Attest:*

RUTH C. MASON          LUTRELLE F. PARKER
*Attesting Officer*      *Acting Commissioner of Patents and Trademarks*